United States Patent
Rocca et al.

(10) Patent No.: US 10,513,409 B2
(45) Date of Patent: Dec. 24, 2019

(54) CONTROL SYSTEM FOR CONTROLLING THE ACCESS TO PROCESSING MACHINERY

(71) Applicant: Fabio Perini S.p.A., Lucca (IT)

(72) Inventors: Mauro Rocca, Capannori (IT); Fabrizio Lorenzi, Altopascio (IT)

(73) Assignee: Fabio Perini S.p.A., Lucca (IT)

( * ) Notice: Subject to any disclaimer, the term of this patent is extended or adjusted under 35 U.S.C. 154(b) by 0 days.

(21) Appl. No.: 15/767,825

(22) PCT Filed: Oct. 11, 2016

(86) PCT No.: PCT/EP2016/074372
§ 371 (c)(1),
(2) Date: Apr. 12, 2018

(87) PCT Pub. No.: WO2017/064077
PCT Pub. Date: Apr. 20, 2017

(65) Prior Publication Data
US 2018/0305160 A1    Oct. 25, 2018

(30) Foreign Application Priority Data
Oct. 13, 2015   (IT) .............. UB2015A4638

(51) Int. Cl.
| | |
|---|---|
| *G06K 7/00* | (2006.01) |
| *B65H 26/00* | (2006.01) |
| *F16P 3/08* | (2006.01) |
| *F16P 3/12* | (2006.01) |
| *B65H 16/00* | (2006.01) |
| *B65H 18/08* | (2006.01) |

(52) U.S. Cl.
CPC ............ *B65H 26/00* (2013.01); *B65H 16/00* (2013.01); *B65H 18/08* (2013.01); *F16P 3/08* (2013.01); *F16P 3/12* (2013.01); *B65H 2407/10* (2013.01)

(58) Field of Classification Search
USPC ................................................. 235/375–385
See application file for complete search history.

(56) References Cited

U.S. PATENT DOCUMENTS

| | | | |
|---|---|---|---|
| 4,993,049 A | 2/1991 | Cupps | |
| 6,519,827 B1 * | 2/2003 | Hayashi | G11B 23/107 269/309 |
| 2006/0175457 A1 * | 8/2006 | Benvenuti | B65H 19/126 242/552 |

FOREIGN PATENT DOCUMENTS

| | | |
|---|---|---|
| EP | 2282106 A1 | 2/2011 |
| JP | H0927021 A | 1/1997 |

* cited by examiner

*Primary Examiner* — Matthew Mikels
(74) *Attorney, Agent, or Firm* — Breiner & Breiner, L.L.C.

(57) ABSTRACT

The system includes a fence inside which machines are arranged that are potentially dangerous for the operators, forming part of a processing plant for processing web material and producing rolls. A passage counting the number of operators entering the fence and exiting therefrom is so controlled as to be accessible only when the machines are not working and to allow a partial operation of the machines inside the fence under particular safety conditions.

30 Claims, 5 Drawing Sheets

CONTROL SYSTEM FOR CONTROLLING THE ACCESS TO PROCESSING MACHINERY

FIELD OF THE INVENTION

The present invention relates to safety systems for accessing areas where there are processing machinery having movable members, for example machines of a production line or a processing line for semi-finished products.

Embodiments described herein comprise a system for controlling the access to a line or to a portion of a line for processing a web material, for instance paper, like typically, but not exclusively, tissue paper. More in general, embodiments described herein refer to systems for controlling the access to machinery having risk areas spaced from one another, to which the access by operators in charge of maintenance shall be allowed only under safety conditions.

BACKGROUND ART

Many industrial plants, such as continuous material processing lines, comprise machinery with movable members that represent a serious danger for the operators if the operators approach the machines when they are running.

However, it is often necessary to make interventions on the machinery, both for maintenance reasons and for performing certain steps of the production or processing cycle, for example to eliminate the cause of a temporary stop of the line. These interventions require that one or more operators move towards the machinery. To avoid accidents, which could have serious and even very serious consequences, it is often necessary to allow the access to the dangerous machinery areas only when the machinery is idle, or is in a safety condition, i.e. a condition different than the normal operating condition.

For instance, in lines for processing continuous web materials, such as paper webs, for producing rolls or other articles starting from a continuous article, different stations are provided in sequence along the processing line. Each station has one or more machines with moving members, performing operations on the continuous web material. Typically, in tissue paper processing for producing rolls, lines are provided comprising one or more unwinders that unwind respective parent reels of great dimensions in order to feed one or more subsequent processing stations. Downstream of the unwinders, embossing units, printing units, perforating units may be provided, as well as a rewinding machine, a tail sealer or other machine for closing the tail end of the rolls formed by means of the rewinding machine.

In lines for producing articles of folded paper, embossing and/or printing units, as well as cutting and folding stations and the like may be provided downstream of one or more unwinders.

Access areas are usually provided between adjacent stations for the access of maintenance operators or other operators in charge of managing the production operations. These operations may be, for instance, recovery operations in case of breakage of the web material, or replacement of exhausted parent reels with new reels.

In many cases, a leading edge of the material shall be inserted in the web material feeding path. This occurs, for example, in case of accidental breakage of the web material due to a malfunction of the line or other unforeseen events.

In some cases, the insertion of the leading edge of the web material through the feeding path is called threading. To thread the leading edge along the feeding path, the various machines arranged in sequence are made operate slowly and partially, by activating at low speed only the members useful for feeding the leading edge of the web material. Generally, during threading it is not necessary to activate all the members of the machines. Typically, in case of embossing or printing units, the gluing systems, the mechanical bonding systems, if any, the perforating units and the printing units may remain idle. This operating mode, wherein the machinery runs only partially and at slow speed, sometimes in an intermitting way, is also called jog.

These threading interventions or other interventions on the machines forming the stations of a processing line require that the operators access risk areas arranged near the machines or, in some cases, along the path of the material to be processed, and therefore between one station and the subsequent one, or between machines of a same station.

In order to reduce the risk of accidents, the risk areas are closed by means of safety gates. In order to open these safety gates and access the respective risk areas, at least the machines adjacent to the risk areas shall be in a safety condition, typically in a condition of stop. Usually associated with the gates are micro-switches, which cause the stop of the line or part of the line if the gate opens.

In some cases, the interventions on the line require that operators access more risk areas one after the other, with the consequent need of repeated operations for opening and closing the safety gates.

These known systems controlling the access to the risk areas are not satisfactory from a safety point of view, as they do not allow to ensure that all operators have left the risk areas before restarting the machines or the line. While to access a risk area it is necessary to stop the machines near this area, or the whole line (otherwise the safety gate does not open), to restart the line or the machines it is only necessary that the safety gate closes again. If the safety gate is closed when an operator is still in the risk area, very dangerous situations may occur, i.e. very risky situations for the operator, as the machines may be restarted even if there are people in the risk area.

A need therefore exists for systems controlling the access to potentially dangerous processing machines, which are more reliable and allow easier interventions and access.

SUMMARY OF THE INVENTION

According to an aspect, a system is provided for controlling the safe access to a processing machinery with moving members, comprising at least one fence surrounding the processing machinery, a first passage to access the inside of the fence and a control arrangement, functionally connected to the first passage. The first passage and the control arrangement are so configured as to count the number of operators entering the fence and exiting therefrom. The control arrangement and the first passage are so configured as to allow the opening of the first passage only when the processing machinery inside the fence (that may be constituted by one or more machines or stations in sequence) is in a safety condition, i.e. a condition wherein for instance the machinery is idle, or in general a condition different than the normal operating condition. The control arrangement and the first passage are configured such that, after an access through the first passage, the return to the normal operating condition of the processing machinery is prevented until the same number of operators who entered the fence through the first passage has exited from said fence through the same first passage.

In this way, it is possible to ensure a high safety of the system, as it is not possible to restart the machinery inside the fence until all operators who entered the fence has exited therefrom. It is also possible to provide a fence surrounding more stations of a complex line, among which risk areas are arranged, which are not easily visible from the outside, without the need for providing a safety gate to access each risk area.

The machinery may comprise a line for processing a web material, typically tissue paper, which can be complete or partial, i.e. limited to some machines of a more complete arrangement of machines in series.

In the present description and the attached claims, risk area means, in general, an area, to which access of one or more operators may be required and where there are moving members, which should be activated only if the operator(s) are outside the risk area. For example, risk areas may be areas transverse to a processing line, i.e. areas that extend transversally to the processing flow, between two stations or between two machines of a sequence of machines or stations arranged in sequence.

In addition to working in more safe conditions, as the machinery cannot be restarted until all operators have safely exited the passage through which they have entered, the operators can also work in more comfortable conditions, as they can access various areas of a line even comprised of more stations in series, without the need for continuously opening and closing the safety gates. This is particularly important when between the access to a risk area and the access to the other risk area it is necessary to run the machinery, for instance in order to thread a continuous material through more stations of a processing line.

The control arrangement may be a simple central control unit, for example a computer, a micro-controller, a PLC or other device or aggregate of programmable electronic devices. In other embodiments, the control arrangement may comprise more than one programmable electronic device, if necessary arranged in series.

According to embodiments of the control system, when inside the fence at least one risk area is provided, a number of safety actuators may be provided in the fence, functionally connected to the control arrangement. Moreover, the first passage may be controlled so that only a number of operators not greater than the number of safety actuators are allowed to enter the fence.

In the present description and the attached claims, safety actuator means an element of the control system that shall be mandatorily actuated by an operator in order that the machinery near, or associated with, a risk area can be activated, for example to perform a movement necessary for threading, or any other movement for a jog operation.

If N safety actuators are provided in a fence, the machinery associated with a risk area is allowed to be actuated only when part of, or all, the safety actuators N are activated. Generally, the number of safety actuators to be activated is equal to the number of operators who entered the fence and have been counted through the access passage. The number of operators that can stay in the fence to perform operations requiring the movement of mechanical members is equal to max N. In this way, the operators can move the members near a given risk area only if each operator activates one of the safety actuators. The safety actuators are so arranged that an operator cannot achieve more than one safety actuator at the same time, and so that they can be achieved by the operator only if the same operator is outside the risk areas.

In order to perform an operation, it is not necessary that the number of operators entering the fence is equal to the number N of safety actuators. In fact, in embodiments described herein, through the control arrangement a function may be set, allowing a number (N-x) of operators (where x<N) to enter the fence. In this case, the system counts the number of operators entering the fence and controls the activation of the machines near the risk areas when (N-x) safety actuators are simultaneously activated. In this way, for example, if N=2, it is possible to allow the intervention of only one operator or of two operators alternatively, based on the operations to be performed. Through a suitable interface with the control arrangement, it is possible to communicate to the system the number (1 or 2) of operators that shall enter the fence, and the control arrangement controls that the activation of the moving members of the machinery is enabled through the activation of only one safety activator, or of both safety actuators respectively.

Alternatively, the simple count of the operators entering the fence indicates how many safety actuators shall be activated in order to allow the operation for which the machinery shall be run, for instance the threading.

In some embodiments, in case a number of operators greater than the number N of safety actuators accesses the fence, the control arrangement prevents the mechanical members in the fence from moving. The movement of the mechanical members can be enabled again only when the number of operators inside the fence will be decreased to N or to a number lower than N. For instance, if M operators enter the fence, where M>N, N being the number of safety actuators in the fence, the control arrangement disables the activation of mechanical members in the fence. When M-N operators have exited the fence (and therefore the number of operators in the fence is not greater than the number of safety actuators), the control arrangement can again enable the activation of the movable mechanical members. The activation is possible only if the number of safety actuators (comprised between 1 and N) that are activated is equal to the number of operators still in the fence.

With this configuration, it is possible for a variable number of operators to access the fence under safety conditions, and it is ensured that operations requiring the activation of mechanical members can be performed only if the number of operators present in the fence is equal to, or lower than, the number of safety actuators, every operator having to activate a respective safety actuator to enable the movement of the mechanical members.

Alternatively, or in combination, it is also possible to perform maintenance or other operations requiring the access of a number of operators greater than the number of safety actuators associated with each risk areas by using, to access the fence, a second passage, without passage counter, i.e. counter of the number of people entering the fence and exiting therefrom. This second passage may be controlled traditionally, i.e. it cannot be opened if the machinery in the fence is moving and so as not to allow the restart of the movement until the second passage has been closed.

In this case, or also when, for any reason (for instance a voltage drop), the count of the number of operators passed through the first passage is lost, the control arrangement may be configured and arranged to prevent the recovery of the normal operating condition of the machinery until a reset routine (or recovery procedure) has been performed on the processing machinery. Examples of reset routines are described later on.

The reset routine may be usually performed by using a unique key, with which a person in charge of the line safety or an operator in charge of the reset routine is equipped. One or more unique key readers are provided inside and/or outside the fence. The operator in charge of the reset routine checks the inside of the fence and communicates to the control arrangement that the check has been performed by letting the the unique key reader(s) read the unique key.

Further features and embodiments of the access control system according to the present invention will be described hereunder and in the attached claims, which form an integral part of the present description.

As mentioned, the system may be particularly advantageously used to protect and control the accesses to a tissue paper converting line. The line may comprise at least an unwinder for reels of web material, at least a rewinding machine producing rolls of web material coming from the unwinder, at least a machine for closing the tail end of the rolls formed by the rewinding machine.

More generally, the tissue paper converting line may comprise at least one unwinder for reels of web material, at least one machine downstream of the unwinder and a threading and feeding path for the web material between the unwinder and said at least one machine downstream of the unwinder.

BRIEF DESCRIPTION OF THE DRAWINGS

The invention will be better understood by following the description and the accompanying drawing, which shows non-limiting practical embodiments of the invention. More particularly, in the drawing.

DETAILED DESCRIPTION OF EMBODIMENTS

In the description below and the attached figures, reference is made to a tissue paper processing line, through which paper reels are processed and transformed into rolls of smaller radial dimensions, that are then cut, orthogonally to the roll axis, into logs destined for distribution to the final user. However, it should be understood that features of the control system described herein may be advantageously used for controlling the access to processing or converting lines or machines other than those for producing rolls of tissue paper. In particular, the system described herein may be advantageously used to control the access to machines in general, where it is necessary to thread a continuous material, such as a web or yarn material from an unwinder towards one or more downstream machines, or in other situations when it is necessary to manage and control the access to risk areas of a processing line or of a machinery or aggregate of processing machines, when it is necessary to perform interventions, during which the machines shall run in an intermittent or partial way, called jog.

Figure 1:
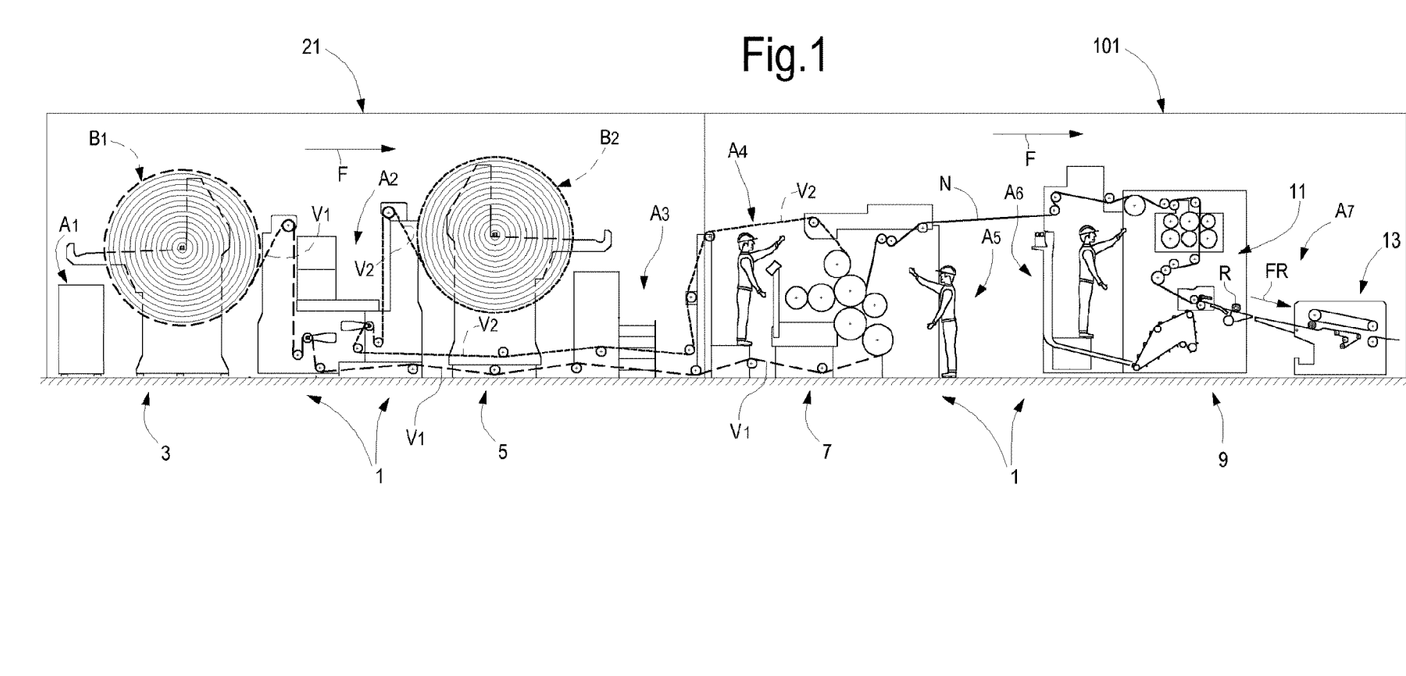
FIG. 1 is a side view of an exemplary embodiment of a tissue paper converting line for the production of rolls.

FIG. 1 is a side view of the tissue paper converting line, indicated as a whole with reference number 1. The converting line 1 described herein comprises a certain number of stations, illustrated just by way of example, arranged in sequence along the web material feeding direction, indicated by the arrow F. It should be understood that the number and the type of stations and corresponding machines may vary according to the line configuration, the type of material to be produced etc. For instance, in the illustrated embodiment plies of web material coming from parent reels are processed in order to produce logs of multi-ply web material. In other embodiments, the converting line may produce, for instance, paper towels or handkerchiefs or other folded articles.

In the illustrated embodiment, the converting line 1 comprises a first unwinder 3 and a second unwinder 5. The unwinders 3 and 5 unwind reels B1, B2 of tissue paper plies V1 and V2, fed along feeding paths converging on a station arranged downstream of the unwinders 3 and 5, where an embossing unit or embossing-laminating unit 7 is arranged. The two plies V1 and V2 are embossed and bonded together, for instance glued, in the embossing-laminating unit 7, and the multi-ply web N thus obtained is fed along a feeding path towards a rewinding machine 9, passing through a perforator 11 upstream of the rewinding machine 9. The rewinding machine 9 winds the multi-ply web N into rolls R that are then fed, according to arrow FR, to a sealing machine 13 for sealing the tail end of the rolls R.

In other embodiments, the embossing, or embossing-laminating unit 7 may be omitted, and, if necessary, replaced with a mechanical ply-bonding unit for bonding the plies V1, V2. In other embodiments, one or more printing units may be provided.

The single machines forming the processing line 1 are known per se; therefore, they will not be described herein. They comprise a plurality of moving members, such as arms, rollers, chains, belts, shafts and the like, that represent a danger for the operators.

Among the different stations of the line 1, areas are provided that shall be accessible by the operators in charge of the maintenance or the operation of the line. Some of these areas are arranged along the line between adjacent machines of the same line. Below, the areas near the machines having moving members are also indicated as "risk areas", as accessing and staying in these areas can be dangerous for the operators due to the closeness to mechanical members, if these members move when the operators are in the risk area.

For instance, in FIG. 1 references A1-A7 indicate risk areas extending transversally to the processing line 1. A first risk area A1 is arranged upstream of the first unwinder 3, a second risk area A2 is arranged between the first unwinder 3 and the second unwinder 5, a third risk area A3 is arranged downstream of the second unwinder 5, a fourth risk area A4 is arranged upstream of the embossing-laminating unit 7, a fifth risk area A5 and a sixth risk area A6 are arranged between the embossing-laminating unit 7 and the rewinding machine 9, and a seventh risk area A7 is arranged between the rewinding machine 9 and the machine 13 closing the tail end end of the rolls R produced by the rewinding machine 9.

Figure 2:
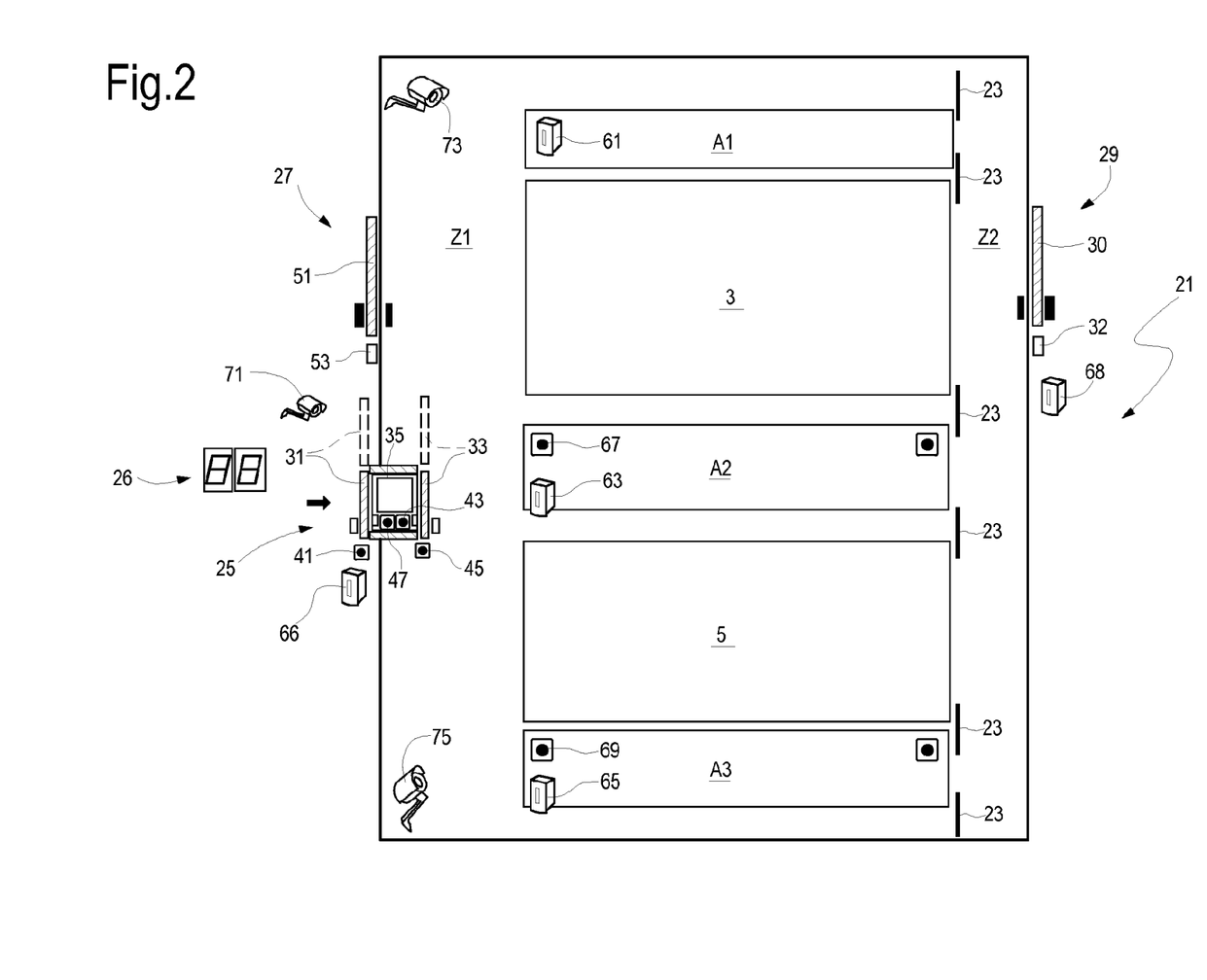
FIG. 2 is a schematic plan view of a first fence surrounding the unwinders of the converting line of FIG. 1.
Figure 3:
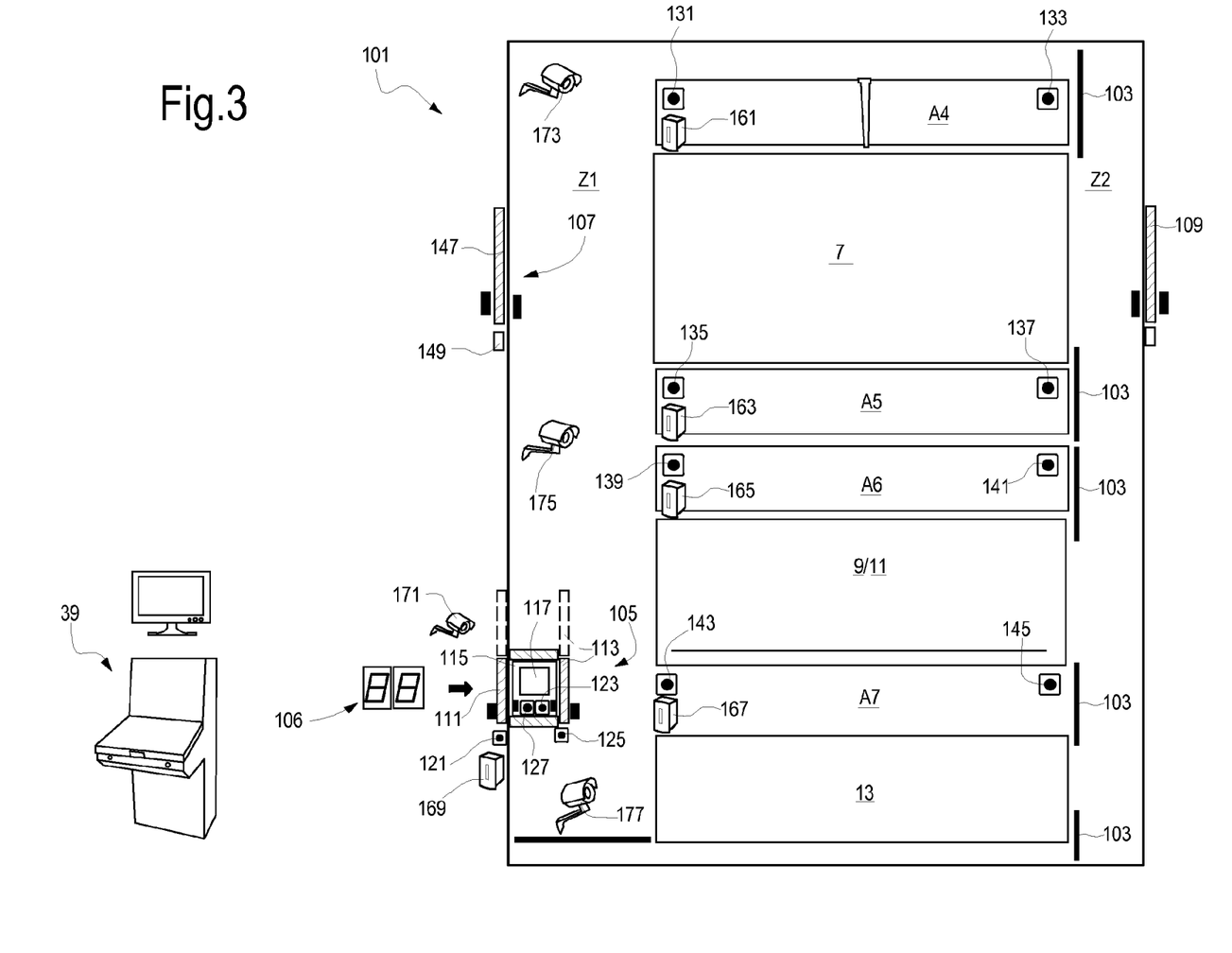
FIG. 3 is a schematic plan view of a second fence surrounding the embosser, the rewinding machine and the machine for closing the tail end of the rolls of the processing line of FIG. 1.

The machinery formed by the unwinder 3, 5, the embossing-laminating unit 7, the perforator 11, the rewinding machine 9 and the machine 13 for closing the tail end of the rolls, is protected by means of one or more fences. In the illustrated embodiment, two fences are provided, schematically illustrated in FIGS. 2 and 3, showing a schematic plan view of each fence with the machines arranged therein. It should be understood that the number and the subdivision of the fences may be different than what described herein, for instance according to the type and number of stations and machines forming the processing line.

In the illustrated embodiment, with specific reference to FIG. 2, and with reference again also to FIG. 1, a first fence 21 surrounds the risk areas A1, A2, A3, the first unwinder 3 and the second unwinder 5. The fence 21 may be designed in any way that is suitable to fulfil the function of preventing an uncontrolled access to the machines and to the risk areas provided therein.

In the illustrated embodiment, the fence has two areas, respectively indicated with Z1 and Z2. The area Z1 is provided on one side of the converting line 1 and the area Z2 is provided on the other side of the converting line 1. In advantageous embodiments, the machines of the converting line 1 inside the fence 21 are so arranged that the side thereof where the driving members are provided faces the area Z2, while the risk areas A1, A2, A3 are arranged with an access facing the area Z1. Barriers 23 prevent the operators assigned to the maintenance or operation of the line from passing from the area Z1 to the area Z2 and vice versa.

In the illustrated embodiment, the fence 21 has a first passage 25 and a second passage 27 for entering the fence 21. The first passage 25 and the second passage 27 are so configured and controlled as to allow the access to the inside of the fence 21 only when the machines protected by means of the fence 21, i.e. the unwinders 3 and 5, are in a safety condition, different than the normal operating condition. For instance, the safety condition may be a stop condition or a stand-by condition of the unwinders 3, 5. In general, the safety condition allowing the opening of the first passage 25 may be equal to, or different than, the safety condition allowing the opening of the second passage 27. In other embodiments, the safety conditions may be equal for both the access through the passage 25 and the access through the passage 27.

The safety condition may be set by means of a central control unit managing the control system controlling the accesses to the line 1, for example by means of a user interface. For instance, the opening of the two passages 25, 27 may be disabled when the safety condition (for example the stop of the machinery) is not met. In other embodiments, the opening of anyone of the passages 25, 27 may cause the line 1 or the machines 3, 5 inside the fence to enter a safety condition. In some cases, if the production speeds of the single machines along the line 1 are correlated together, the access to fence 21 may also require, or cause, the stop of the machines inside the other fence, that will be described below, and vice versa.

It is also possible that the access to the fence 21 is allowed only provided that an operator has made the line 1 move from a normal operating condition to a safety condition and provided that, in combination to this, sensing members are associated with the passages 25, 27, preventing the normal operation of the machinery inside the fence 21 when an operator passes, or try to pass, through any one of the passages 25, 27.

In the illustrated embodiment, the first passage 25 and the second passage 27 are arranged so as to allow accessing the area Z1 and not the area Z2. In the embodiment illustrated in FIG. 2, the fence 21 has a third passage 29 inside the fence, arranged on the opposite side with respect to the first passage 25 and to the second passage 27. Through the third passage 29 it is possible to enter the area Z2, but not the area Z1 of the fence 21, due to presence of the the barriers 23. Vice versa, through the passages 25, 27 it is not possible to access the area Z2.

The first passage 25 may be configured so as to determine (to count) the number of operators entering the fence 21 and the number of operators exiting from the fence 21, through the system control arrangement. Through a suitable configuration of the passage, it is also possible that the first passage 25 allows the transit of only one person at a time. The first passage 25 may be also configured so that a pre-set maximum number of operators can enter the fence 21 through it, for example only one operator, for the reasons that will be apparent below. In some embodiments, the first passage 25 may be set so as to allow the access of a maximum number of operators, for instance for threading the paper plies, or to any number of operators. In some embodiments, according to the type of access that has been set (limited number of operators or any number of operators), some functions of the line 1 can be enabled or disabled.

In order to allow these functions, the first passage 25 may be associated with a suitably programmed central control unit constituting a control arrangement or forming part thereof, indicated with 39 (FIG. 3).

Figure 5:
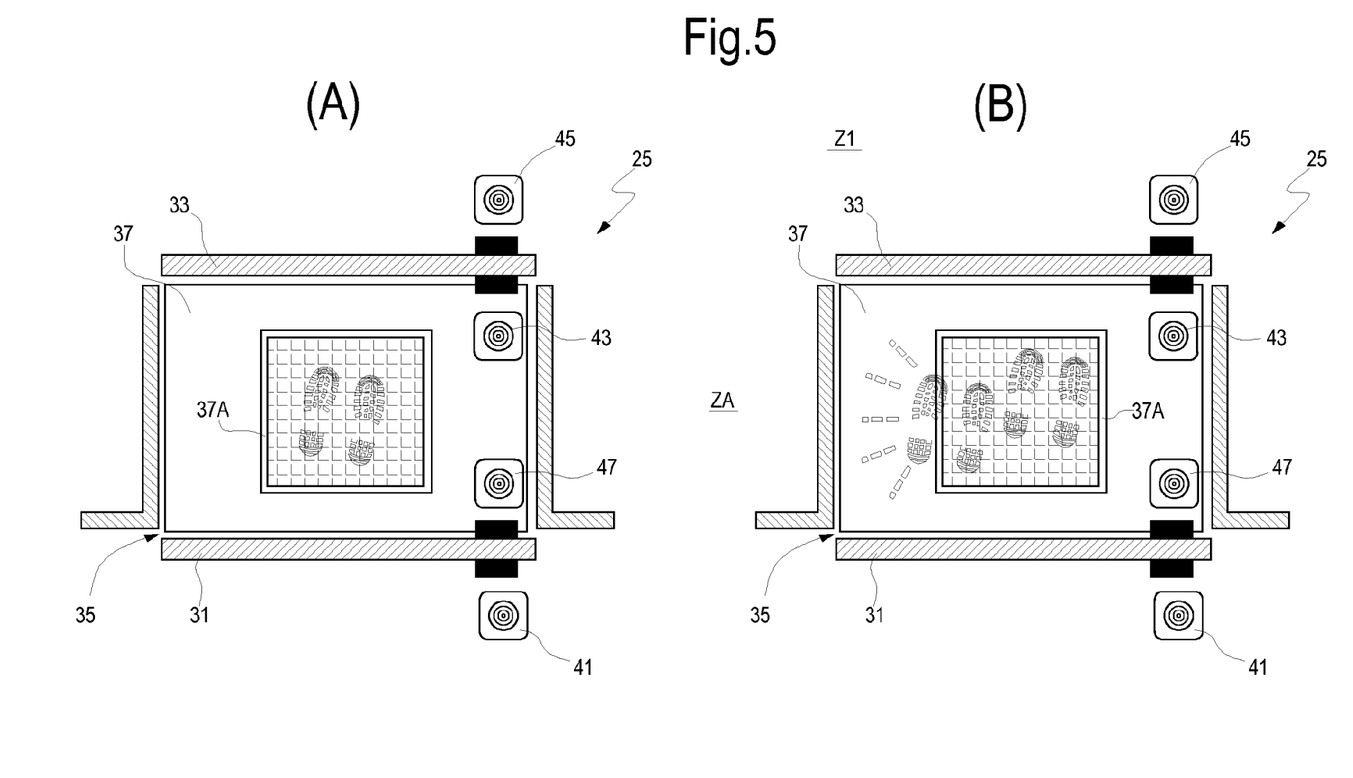
FIG. 5 is a simplified plan view of a passage with two access doors in series.

As schematically indicated in FIG. 2 and in the schematic plan view of FIG. 5, the first access 25 comprises, in the illustrated embodiment, a first access door 31 and a second access door 33. In the present disclosure, access door means any element that can be opened, for instance a sliding element or a pivoting element, allowing to open a passage through the fence 21. The access doors 31 and 33 are arranged in series, i.e. in sequence, so that, in order to enter the fence 21, it is necessary to pass sequentially through the first access door 31 and the second access door 33, while, in order to exit the fence 21, it is necessary to pass sequentially through the second access door 33 and then the first access door 31.

A transit area 35 is defined between the first access door 31 and the second access door 33. In order to control the accesses through the first passage 25, the transit area 35 may comprise devices allowing the passage of only one person at a time entering the fence 21 and/or exiting the fence 21.

According to a possible embodiment, a platform 37 (FIG. 5) may be provided in the transit area 35, equipped with suitably arranged sensors. The platform 37 may have a central area, delimited in FIG. 5 by means of a rectangular line 37A, the dimension whereof is such that only one operator can stay on it, as schematically indicated by means of the footprints illustrated in FIG. 5(A). Suitable sensors or load cells arranged outside the perimeter surrounding the central area, and, if necessary, also arranged along the rectangular line 37A, determine whether an operator is partially or completely outside the perimeter delimited by the rectangular line 37A. FIG. 5(A) schematically illustrates the situation in which an operator is correctly positioned in the area delimited by the rectangle 37A, while FIG. 5(B) shows a situation in which two operators are in the transit area 35. As the surface of the area delimited by the rectangular line 37A is too small to allow the presence of two operators therein, a foot of the second operator in the transit area 35 rests on the rectangular line 37A and/or on the area of the platform 37 outside the rectangular line 37A. This situation is detected by means of sensors (not shown) arranged below the platform 37. When this situation occurs, the system does not allow the opening of the second access door 33 if the operators are trying to enter the fence 21, or it does not allow the opening of the first access door 31 if the operators are trying to exit from the fence 21.

In other embodiments, means can be associated with the transit area 35, additional or different than those described, in order to determine whether more than one operator is present between the first access door 31 and the second access door 33. For instance, weight sensors or load cells may be provided associated with the platform 37, determining the weight on the platform. Assuming that the average weight of an adult person is comprised between a minimum weight Pm and a maximum weight PM, it is possible to prevent one of the access doors 31, 33 from opening if the detected weight is greater than a preset threshold determined according to Pm and PM, that is exceeded only when two or more operators, whose weight is comprised between Pm and PM, are on the platform.

In other embodiments other systems may be provided to detect the number of operators in the transit area 35, for example volume sensors or the like.

In general, independently of the type of technology used, what is important is to verify that the number of operators temporarily staying in the transit area 35 is not greater than one.

The first access door 31 and the second access door 33 may be provided with opening actuators, or with blocking members, or with other systems preventing or allowing the opening thereof, based on the conditions of the line 1 and of the control system for controlling the access to the line 1, the system comprising the fence 21, the passages 25, 27 and other equipment described below. The access control system may comprise the central control unit schematically indicated with 39 in FIG. 3. The central control unit 39 may comprise a microprocessor, a PLC or other programmable electronic device, interfaced with the first access door 31, with the second access door 33 and with the means determining the number of people present in the transit area 35, for example the sensors under the platform 37, or other suitable electric and electronic devices that will be described below and that perform also other safety functions of the control system controlling the access to the line 1.

As it will be clearly apparent from the description below, in the illustrated embodiment the control system for controlling the access to the line 1 also comprises a second fence comprising electronic, mechanical and electro-mechanical members similar to those of the first fence 21. Also these member can be managed by means of the same central control unit 39. However, it is also possible to use a distributed intelligence system, wherein more peripheral control units manage only some of the electric, electronic and electro-mechanical devices of the control system, or two central control units, one for each fence. The various peripheral or central control units may be interconnected so as to form a network with or without hierarchical structure. The (central and/or peripheral) control unit(s) constitute, or are part of, a control arrangement of the control system controlling the access to the line 1.

A first control member 41 may be associated with the first access door 31 to control the opening of the first access door 31. The first control member 41 is arranged outside the fence 21 and allows an operator to open the access door 31. A second control member 43 is associated with the second access door 33 to control the opening of the second access door 33. The second control member 43 is arranged within the transit area 35, and is used by an operator who is in the transit area 35, and who has therefore already passed the first access door 31, to open the second access door 33. A third control member 45 is associated with the second access door 33 to control the opening of the second access door 33. The third control member 45 is arranged inside the fence 21 and is used by an operator who is inside the fence 21 to open the second access door 33. Lastly, a fourth control member 47 is associated with the first access door 31 to control the opening of the first access door 31. The fourth control member 47 is arranged within the transit area 35 and therefore allows an operator who is in the transit area 35 to open the first access door 31.

Inside the fence and/or the transit area 35 emergency pushbuttons may be provided, allowing to open the access doors 31, 33 for example in case of voltage interruption, a situation that, anyway, entails the stop of the line 1.

The control members 41, 43, 45, 47 may be suitably interfaced with the central control unit 39, or with a peripheral control unit, so that it can disable one or the other of the control members according to the operating conditions of the line 1 and/or to other conditions, in particular according to the presence of more operators in the transit area 35, and the condition of opening or closing one or the other of the two access doors 31, 33, as it will be better explained with reference to the access control modes.

The control members 41, 43, 45, 47 may be simple pushbuttons. In other embodiments, all or some control members may be constituted by, or may comprise, readers for reading a means or support containing an ID code, for instance RFID readers, or optical readers for barcodes, ORC characters or other codes. In other more sophisticated embodiments, the control members may comprise devices reading biometric features of the operator.

In general, in these cases the control members are so configured as not only to activate (under given conditions) the opening of the respective access door 31 or 33, but also to acquire a piece of information suitable to identify the operator who has controlled the opening of the access door. This piece of information may be stored, if necessary together with information on access date and hour, which can be useful to create an event log.

The control members may be also functionally connected to the central control unit 39 so that opening commands for the respective access doors can be enabled or disabled therethrough, and so as to allow the central control unit to collect and store information about the accesses to, and the exits from, the fence 21.

An access counter may be associated with the first passage 25 configured to count the number of operators entering through the passage 25 and the number of operators exiting therethrough. Number 26 schematically indicates a display of the access counter. This counter can be provided in the central control unit 39.

In the embodiment of FIG. 2, the second passage 27 comprises a third access door 51 inside the fence 21. The third access door 51 may be associated with a control member 53 preventing the opening of the access door if the machinery inside the fence 21 is moving and preventing the restart of the machinery if the third access door 51 is not closed.

The third access door 51 of the second passage 27 may be suitably interfaced with the central control unit 39, so that the opening of the third access door 51 of the second passage 27 is disabled if the line 1 or the machinery inside the fence 1 are not in a safety condition. Through the connection to the central control unit 39 it is possible to prevent the line 1 or the machinery inside the fence 21 from being restarted if the access door 51 is open.

In other embodiments, the second passage 27 may be omitted. The function of the second passage 27 may be performed by the first passage 25, for instance by disabling the counting functions, i.e. the functions of counting the operators entering and exiting the fence, and the function of individual passage for an operator at a time.

As mentioned above, risk areas A1, A2, A3 are provided inside the fence 21. A unique key reader, forming part of the access control system, may be associated with each risk area. In FIG. 2, the unique key readers associated with the risk areas A1, A2, A3 are indicated with 61, 63, 65. Unique key reader means herein any device suitable to read a unique key reproduced on, or stored on, a suitable means. A unique key may be for example a code stored in an RFID tag, contained for example in a card or a token. In this case, the unique key reader is a RFID reader. In other embodiments, the unique key may be a barcode, or an OCR code, or any other machine readable code stored on a card, a bracelet or on any other suitable support with which an operator is equipped. As it will be clear from the description below of modes for accessing the fence 21, a purpose of the unique key reader is to verify the passage of an operator associated with the unique key. For the reasons that will be apparent below, only one unique key is available and is assigned to only one operator.

The unique key may also be a biometric feature of the operator instead of a piece of information stored on an external device. The biometric feature may be the operator's voice (vocal print), the fingerprint, or a capillary net, for instance a finger, or the retina of the operator, or any other feature suitable to identify the operator in a unique way.

A further unique key reader 66 is arranged outside the fence 21, for instance near the first passage 25. The unique key readers 61, 63, 65, 66 are interfaced with the central control unit 39 or with one or more peripheral control units, for the reasons described below.

The system controlling the access to the machines 3, 5 of the line 1 may furthermore comprise a safety actuator for some or all the risk areas A1, A2, A3. In the present disclosure, safety actuator means a device or aggregate enabling the activation of these functions. The safety actuator not only enables the activation of the functions, but may also be used to manage or control these functions. The actuator is called safety actuator as it is positioned, with respect to the machinery or parts thereof that are activated by the actuator (or whose activation is enabled by means of the safety actuator), in such a position that the operator may activate the safety actuator only when he/she is outside the corresponding risk area, i.e. the area near the machinery or part thereof whose activation may be enabled by means of the safety actuator.

In the example of FIG. 2, a first safety actuator 67 is provided, associated with the risk area A2, and a second safety actuator 69 is provided, associated with the risk area A3. The risk areas A2 and A3 are adjacent to the exit side of the first unwinder 3 and the second unwinder 5. In the illustrated example, the risk area A2 is the area where the operator shall access to prepare the unwinder 3 for the threading of the ply V1, while the risk area A3 is the area where the operator shall access to prepare the unwinder 5 for the threading of the ply V2.

As mentioned above, threading requires the activation of some mechanical members of the corresponding machinery, through which the ply shall be threaded. This activation occurs by means of the corresponding safety actuator 67 and 69, or is enabled by means of the respective safety actuator 67, 69. As the safety actuator is outside the risk area A2 or A3, the operator must exit the risk area before actuating the movement (jog) of the unwinder members performing the threading. If the safety actuator only enables the activation of the members that shall move to perform the threading, the safety actuator will be so configured that the operator shall maintain it actuated, for instance pressed, for all the time he/she controls, by means of a different control member, for instance a pushbutton station, the activation and the execution of the movements of the members of the unwinder performing the threading.

The threading therefore occurs under safety conditions.

Having described the components of the control system with reference to the first fence 21, below two different modes for accessing inside the fence 21 will be described.

A first access mode is performed when it is necessary, for example, to thread one or both the plies V1, V2. This may occur not only when the line 1 is started for the first time, but every time the plies break. In this case, the leading edge of the ply V1 or V2 shall be inserted through its path in the line 1.

Usually, the threading may be performed by only one operator. He/she enters the fence 21 through the first passage 25. The first passage 25 may be so controlled as to allow the access to the fence 21 to only one operator, i.e. to the minimum number of operators required to perform the operation (the threading in this example).

Figure 4:
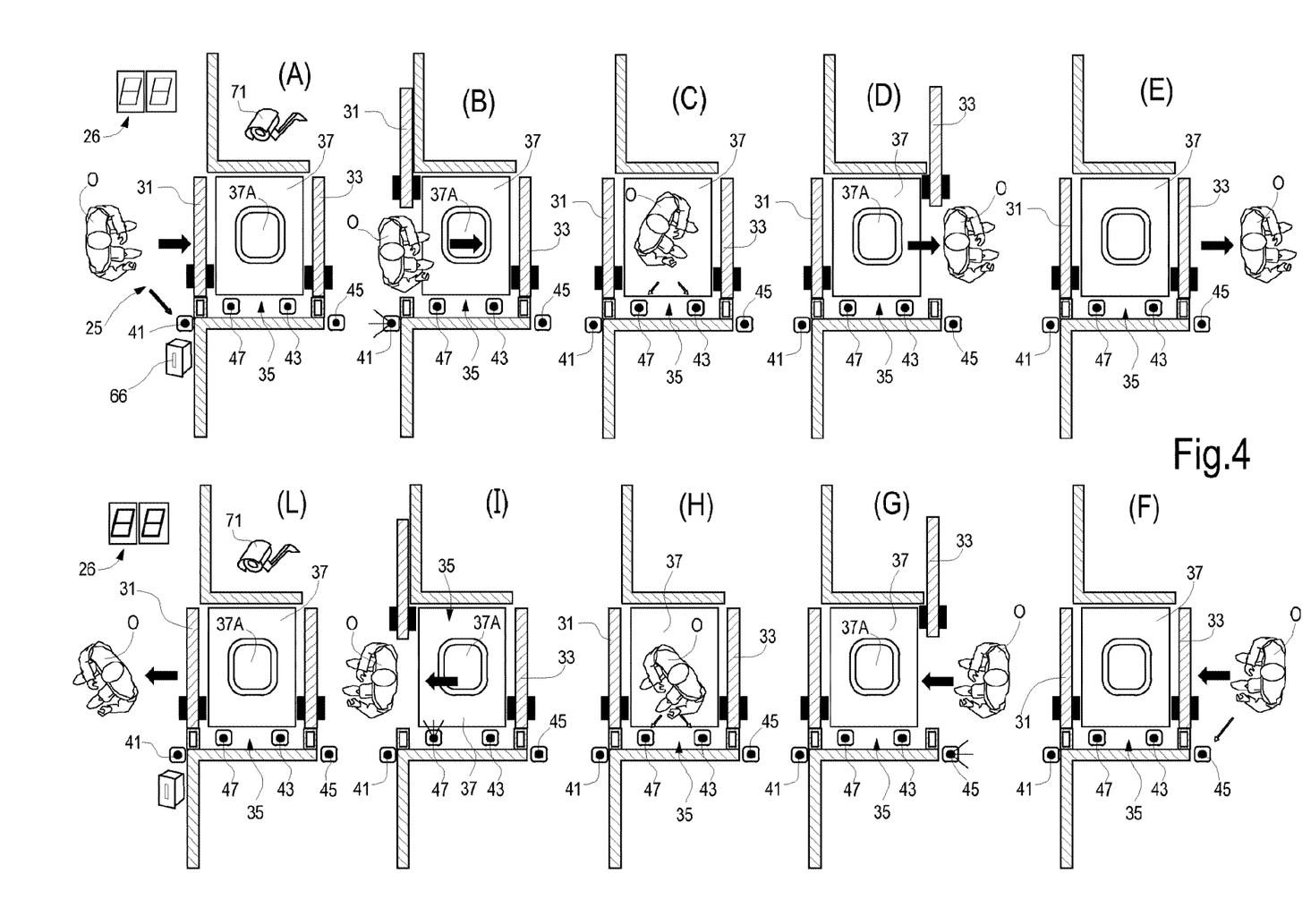
FIG. 4 shows the sequence wherein an operator accesses and then exits a fence.

The access procedure is illustrated in the steps from (A) to (E) of FIG. 4. The operator O activates the first control member 41, FIG. 4(A). If the machines inside the fence 21 are in safety condition, for instance they are idle, the first access door 31 opens and the operator O enters the transit area 35, as shown in FIG. 4(B), otherwise the access to the fence 21 is not allowed. Alternatively, the line may be stopped in case the operator tries to access through the first access door 31, and, after this stop, the operator may open the first access door 31.

In the subsequent step, the first access door 31 closes. The operator O may interrupt the procedure and may exit again by acting on the fourth control member 47. Vice versa, the operator O may access the inside of the fence 21 by activating the second control member 43. The second access door 33 opens only if in the transit area 35 there is only one operator O. Otherwise, the second access door 33 cannot be opened. Moreover, the second access door 33 cannot be opened until the first access door 31 has been closed.

In this way, only one operator at a time is allowed to enter the fence 21. The operator access is recorded, for instance through the central control unit 39. The passage of the operator O may be displayed by means of the counter 26.

As mentioned, the central control unit 39, which manages the access control system, may be programmed so that only one operator O can access the fence 21 through the first passage 25. In this case, once the first operator O has entered the fence 21 through sequential opening of the first access door 31 and of the second access door 33, the first passage 25 is disabled and does not allow other operators to enter. In other embodiments, or for performing other operations, as described below, it is possible to allow a different number of operators to access the fence, if necessary without limitations. Anyway, the number of operators passing through the first passage 25, both entering the fence 21 and exiting therefrom, is counted. In this way, the central control unit 39 knows the overall number of operators O who have entered the fence 21.

Once the operator is inside the fence 21, he/she can perform the required operations, for instance the threading of one or both plies V1 and V2. Once the threading operation has finished, the exit from the fence 21 occurs as illustrated in the sequence of FIGS. 4(F) to 4(L). The operator activates the third control member 45 for the opening of the second access door 33. The access door 33 opens if the first access door 31 is closed and if the transit area 35 is empty. Otherwise, the opening of the access door 33 is not possible.

FIG. 4(G) shows the opening of the second access door 33 allowing the operator O to enter the transit area 35.

When the operator O has entered the transit area 35, the second access door 33 closes, as shown in FIG. 4(H) and the first access door 31 can be opened. This first access door is opened through the fourth control member 47, namely controlling the opening of the first access door. The operator exits through the first access door 31, as shown in FIG. 4(I). Once the operator O has exited, the first access door 31 closes. The exit of the operator O is recorded and the counter 26 is decreased by one. If only one operator has entered the fence 21, the counter 26 comes back to zero. If more operators have entered the fence 21, the counter 26 will come back to zero only after all the operators who have entered the fence 21 have performed the exit procedure described above.

By counting the number of operators who have entered the fence 21, which is possible thanks to the fact that the first passage 25 allows the passage of only one operator at a time, it is possible to determine whether all operators who have entered the fence 21 have exited therefrom. The line 1, or the machinery inside the fence 21, may be restarted only after the central control unit 39 has detected that the same number of operators who have entered the fence 21 have exited therefrom through the passage 25.

This procedure allows to ensure that the line 1, i.e. all the machinery inside the fence 21, are restarted only after all the operators have actually exited the fence.

In this step, the second passage 27 may be suitably disabled. It is also possible that the central control unit 39, or another peripheral control unit, controls that the opening of the second passage 27 causes the stop of the line, requiring a reset procedure or routine, as described below.

When the operator O is inside the fence 21, he/she may perform operations on the machinery inside the fence 21, for instance the threading of plies V1 and V2. To this end, he/she shall enter more risk areas A1, A2, A3 sequentially, and perform manual operations, for instance introducing the leading edge into threading transport belt. Following these manual operations, the machinery is partially activated, for instance the threading belts are activated.

In order to perform this further operation under safety conditions, the operator must go outside the corresponding risk area, for instance the area A2 or A3, where he/she finds the respective safety actuator 67, through which he/she can activate the mechanical threading operations or other operations that shall be performed by means of one or more movable mechanical members of the machinery in the fence 21. The safety actuator 67 may be a simple pushbutton or any other actuation member that, once activated, starts the movement of the mechanical members. In other embodiments, the safety actuator 67 may be a member that shall be activated by the operator only in order to confirm his/her presence outside the risk area (and therefor confirm that he/she is no longer in the risk area), thus enabling the subsequent activation. A different actuation member may be enabled by means of the safety actuator, and through this different actuation member the activation of one or more mechanical members of the machinery inside the fence 21 can be activated.

Interventions by the operator may be done in all the risk areas where safety actuators are provided.

Once these activities have been finished, the operator exits the fence 21 according to the procedure described above with reference to the sequence of FIGS. 4(F)-4(L).

As only one safety actuator 67 is associated with each risk area A2, A3, where one or more movable members may be activated for threading, in order to avoid the risk that two operators enter the fence 21 and that one of them acts on the safety actuator, thus activating the mechanical members while the other operator is still in the risk area, in some embodiments the first passage 25 is controlled by means of the central control unit 39 so as to allow always the presence of maximum one operator in the fence 21, which is possible thanks to the above described means associated to the passage 25 for counting the number of operators entering and exiting through the passage. It is possible, for example, that the access doors of the first passage 25 do not open allowing the access of a second operator in the fence if there is already another operator inside it.

Alternatively, the control of the first passage 25 may be so programmed that, if the counter counts more operators entering the fence 21, all the activations are disabled, so that it is impossible to perform the threading. Only when all the operators except for one have exited the fence 21, the central control unit 39 or other unit of the control arrangement restarts the functions allowing the threading under safety conditions.

The example described above provides for a single safety actuator for each risk area. As it will be better explained also with reference to FIG. 3, this is not the only possible configuration. Namely, a number N of safety actuators may be associated with each risk area, where N is the maximum number of operators who can enter the fence without the central control unit 39 disabling the possibility of performing a jog.

Moreover, also in the configuration of FIG. 2 it is not necessary that the system allows the access of only one operator in order to perform threading. Namely, inside the fence 21 two safety actuators 67, 69 are provided, arranged, with respect to the risk areas and to each other, so that an operator cannot activate a safety actuator staying in a risk area and so that it is not possible to act on two safety actuators contemporaneously. Therefore, the central control unit 39 may be so configured as to allow the access to the fence 21 to a number N of operators equal to the overall number of safety actuators positioned as described above, independently of the number of safety actuators associated with each single risk area. In the case of FIG. 2, for instance, maximum two operators can enter the fence. When they have entered, the movements of mechanical members may be activated in one or the other of the risk areas, for instance to perform threading, only once both the safety actuators are activated by the two operators. This allows that no operators are inside the risk areas and therefore the movable members necessary for threading, or any jog operation, can be activated.

If one or more further operators enter the fence through the passage 25, the consent to the activation of the mechanical members is denied, as the operators exceeding the number of safety actuators (two in the example) could accidentally enter one or the other risk area and be injured. Only after the number of operators in the fence 21 is equal to two or one it is possible to return to the operating condition allowing the activation of the mechanical members. This operating condition requires the activation of one or two safety actuators, based on whether two or one operator is still in the fence 21.

In view of the above description, it is clearly apparent that the system controlling the access of one or more operators to the fence 21 and to the machines contained therein ensures a very high safety standard, significantly higher than that of the systems of the current art.

Maintenance interventions requiring more operators may be done for instance using the second passage 27 instead of the first passage 25. The second passage 27 can open when the machinery in the fence 21 is in safety condition, for instance it is idle. Through the control member 53, the third access door 51 opens allowing the entrance of the maintenance operators. The number of people entering the fence 21 in this case is not detected. The maintenance operators can exit the fence 21 through the same third access door 51, after having performed the maintenance operations. Alternatively, the third access door 51 of the second passage 27 may be closed and the maintenance operators can exit through the first passage 25.

However, as the number of people entered the fence 21 has not been detected, it is not possible to know, based on the data acquired by means of the control arrangement (for instance central control unit 39 or peripheral control units) when and whether all the operators have exited the fence.

For greater safety, it is therefore suitable to perform a routine or procedure allowing to verify that no operator is still within the fence 21. This routine or procedure will be called herein reset procedure or reset routine. The reset routine is performed as described below. The reset routine, or recovery procedure, may be performed every time the count of the number of people passed through the passage 25 has been lost for any reason, even when the passage 27 has not been opened.

An operator in charge of the reset of the line 1 is the only person having a unique key, through which the reset routine can be performed. The unique key is the key that can be read by means of the unique key readers 61, 63, 65, 66 described above. As previously mentioned, the unique key may be a physical key, hold by the operator in charge of the line reset, or a biometric feature of the operator in charge of the line reset.

The reset routine may be as follows. The operator in charge of the reset enters the fence 21, for instance through the second passage 27 or through the first passage 25. The two passages 25 and 27 shall then be closed. Once both the passages 25, 27 have been closed, the operator in charge of the reset controls that the area Z1 and each risk area A1, A2, A3 are empty, i.e., that no operator is present in one of the risk areas. In order to communicate to the central control unit 39, or to any other peripheral unit of the control arrangement managing the system, that a given risk area has been controlled and is empty, the operator in charge of the reset routine of the line 1 let the unique key reader, associated with the risk area concerned, read the unique key. For instance, once having verified that no person is in the risk area A2, the operator in charge of the reset routine let the unique key reader 61 read the unique key. The same operation is repeated for all the risk areas of the fence 21.

Once all the unique key readers have read the unique key of the operator in charge of the reset routine, the operator can exit the fence through the first passage 25. To this end, the central control unit 39 may enable the opening of the second access door 31 through the control member 45. Thus, the operator in charge of the reset routine opens the access door 33 and enters the transit area 35. Once the access door 33 is closed, the fourth control member 47 is enabled, through which the operator in charge of the reset routine opens the first access door 31 and exits the fence 21.

The sequence of unique key reading by means of the unique key readers 61, 63, 65 may be any sequence, even if it is also possible to set a given sequence by programming the central control unit 39. In some cases a maximum time interval may be provided between subsequent readings and, when the time is expired, the procedure shall be restart again.

The reset routine may provide that the operator in charge of the reset routine, once exited the fence, let the unique key outer reader 66 read the unique key. This reading finishes the reset routine. Also to perform the unique key reading by means of the outer reader a maximum time delay may be provided with respect to the last reading by means of the unique key readers inside the fence.

The operator in charge of the reset routine must let the various key readers read the unique key only after having verified that nobody is inside the risk areas associated with respective unique key readers. By letting the reader 66 read the unique key, the operator in charge of the reset routine communicates to the central control unit 39 that the fence 21 has been checked and is empty, i.e. that no person in charge of maintenance or other person is inside the fence 21.

Only after having completed the reset routine the central control unit 39 gives the consent to the restart of the line 1 or the machines within the fence 21. The reset procedure or routine described above ensures that the line restart after a stop due to maintenance reasons occurs only after that all the risk areas have been checked. Only one operator, having the unique key, is in charge of the reset procedure or routine and therefore, if the line is restarted when people are still inside the fence, the operator having the unique key is with certainty the responsible of this anomalous situation and any resulting injuries. For this reason it is important that there is only one unique key. In case of damage or theft thereof, it will be necessary to produce a new unique key, different from the previous one and to program again the central control unit or other control unit of the control arrangement of the system.

To ensure a further safety degree, the system may be provided with one or more cameras 71, 73, 75, so arranged as to frame strategic areas of the fence and/or of the machines therein. The cameras may interface the central control unit 39 and/or other devices for managing and storing the records, or a monitor of a remote control room.

In an alternative embodiment, the fence 21 may be realized with only one passage 25, provided with a counting arrangement for counting the number of operators entering and exiting the fence 21 through the passage. Or it is possible to program the control arrangement so as to use the passage 25 also for the entrance of an unlimited number of operators for maintenance operations, alternatively to the access through the passage 27.

In this case, the central control unit 39 may be programmed so that:
- when only one operator enters the fence 21, the members (in particular the safety actuators 67, 69) allowing threading are activated. In the way described above, the activation of the jog of the mechanical members necessary for threading occurs under safety conditions if only one operator is inside the fence 21;
- when more than one operator enters the fence 21, the machines inside it are disabled, so that no risk condition can occur. A number of operators greater than one may be required for maintenance reasons;
- to restart the machines inside the fence 21, it is necessary that the passage 21 detects a number of exits equal to the number of entrances, i.e. it is necessary that it is determined, through the control of the passage 21, that all the operators who have entered the fence have also exited it.

In any case, even if the first passage 25 is used only for threading operations, with the entrance of a limited number of operators, if the count of the numbers of operators entering or exiting through the passage 25 is lost, for instance in case of a temporary voltage drop, it is also possible to provide that in order to restart the machines inside the fence, a reset procedure or routine as described above is necessary, using the unique key and the respective readers 61, 63, 65, 66 arranged inside and outside the fence 21.

In some embodiments the maintenance operations may be enabled only by the operator in charge of the reset procedure, for instance through reading of the unique key by means of the reader 66. In this way it is possible to communicate to the system that the limitation of the number of people simultaneously present in the fence 21 is suspended and that the restart of the line 1 may be performed only after having performed the reset routine. Moreover, in this case the central control unit 39 prevents any partial operations, for instance threading operations. This because, as the number of people who entered the fence 21 is unknown, it is not possible to ensure that the operations occur when all the operators are outside the risk areas.

The third passage 29 may be a traditional passage, like the second passage 27. It can comprise a door 30 with a control member 32 allowing, under the control of the central control unit 39, to access the area Z2 of the fence 21 through the third passage 29 only then the machines inside the fence 21 are idle. Furthermore, through the central control unit 39 the control member 32 allows restarting the machines in the fence only after the door 30 is closed. Practically, the third passage 29 operates in the same way as the second passage 27.

The area Z2 can be easily checked from the outside of the fence or from the third passage 29, as there are not risk areas extending between consecutive machines contained in the fence 21. It is therefore possible to manage this third passage like a normal access gate. For instance, after stopping the machines inside the fence 21, one or more operators enter the area Z2 of the fence to perform, for instance, maintenance operations. Once these operations have been finished, the operators exit and close the third passage. At this point the line can be restarted.

For a greater safety degree, to the third passage 29 a unique key reader 68 may be associated, similar to the unique key readers 61, 63, 65, 66. In this case, the operator in charge of the reset routine can be also in charge of a reset routine in case of access to the area Z2 of the fence 21. The reset routine may be limited, in this case, to the following operations:
  access to the area Z2;
  check that no people are in the area Z2;
  exit and closing of the door 30;
  inserting the unique key in the unique key reader 68 and reading of the unique key by means of the unique key reader 68, which communicates the reading to the central control unit 39, thus enabling the restart of the machines in the fence 21.

Both the reset routines described for the area Z1 and for the area Z2 may be performed, or only one of them, according to the type of accesses occurred and according to whether the count of passages through the first passage 25 has been lost.

FIG. 3 illustrates an arrangement of elements similar to that of FIG. 2 for a second fence surrounding the embossing-laminating unit 7, the rewinding machine 9, the perforating unit 11 and the machine 13 for closing the tail edge of the rolls produced by means of the rewinding machine 9. The fence is indicated with 101 and therein two areas Z1 and Z2 are identified, arranged at the sides of the line 1, i.e. of the machines 7, 9, 11, and 13. Barriers 103 prevent the transit of people from the area Z2, where there are the driving members of the machine inside the fence 101, to the area Z1 and to the risk areas arranged between the machines 7, 9, 11 and 13, schematically indicated with A4 upstream of the embossing-laminating unit 7, with A5 and A6 between the embossing-laminating unit 7 and the rewinding machine 9, A7 between the rewinding machine 9 and the machine 13 for closing the tail end of the rolls.

The fence 101 comprises a first passage 105 and a second passage 107 for accessing the area Z1. Moreover, the fence 101 comprises a third passage 109 to access the area Z2.

The first passage 105 comprises a first access door 111 and a second access door 113, arranged in series, similar to access doors 31 and 33 of the first passage 25 of the fence 21. Between the access doors 111 and 113 a transit area 115 is provided, with a platform 107, similar to that provided for the passage 25. The access doors 111 and 113 are also provided with a first control member 121 for controlling the opening of the access door 111 from the outside, with a second control member 123 controlling the opening of the access door 113 from the outside, with a third control member 125 controlling the opening of the access door 113 from the inside, and with a fourth control member 127 controlling the opening of the first access door 111 from the inside, equivalent to the control members 41, 43, 45, 47 of the first access door 31 and of the second access door 33 of the first passage 25 of the fence 21 of FIG. 2.

A counter, schematically indicated with 106, is associated with the first passage 105. The first passage 105 operates and is controlled by means of the central control unit 39 in the same way as the passage 25.

The threading operations through the embossing-laminating unit 7 and the rewinding machine 9 may require the presence of two operators. Each of the risk areas A4, A5, A6, and A7 may be provided, in this case, with two safety actuators, equivalent to the safety actuators 67, 69 of FIG. 2 and indicated with 131, 133 for the risk area A4, with 135, 137 for the risk area A5, with 139, 141 for the risk area A6, and with 143, 145 for the risk area A7. The function of the safety actuators 131-145 is the same described for the safety actuators 61-69, with the only difference that in this case the two safety actuators of each risk area may be arranged at the opposite ends of the respective risk area so as to force the two operators to move to the sides of the machine and to activate both the safety actuators simultaneously in order start the activation of the machine and perform the threading. The activation of the machine is not enabled if the safety actuators of the pair are not simultaneously activated. in this way it is ensured that both the operators are outside the risk area.

In this example, as the safety actuators are arranged in pairs, the central control unit 39 may be suitably programmed to allow access to a maximum of two operators through the first passage 105, that is provided with a system for counting the number of operators entering and exiting. Namely, the presence of pairs of safety actuators ensures that each operation necessary for instance for threading and requiring the movement of mechanical members, occurs when the two operators are in safety position with respect to the risk areas.

The access through the passage 105 occurs as already described for the passage 25.

For maintenance operations requiring a higher number of operators, the access may be through the passage 107, where a third access door 147 is provided with a control member 149 having the same functions as member 53 of FIG. 2.

Alternatively, as already described for the fence 21 of FIG. 2, also for the fence 101 the access for maintenance purposes may be through the passage 105, allowing the entrance of more than two people. In this case, the count of people entering and exiting the fence 101 remains activated, but there is no the possibility to activate, through the safety actuators 135-145, the movements of the mechanical members in the risk areas, as it is not ensured that maximum two operators are present inside the fence.

The second passage 107 may be omitted or made idle, as in the case of the fence 21.

Unique key readers 161, 163, 165, 167 are also provided inside the fence 101, each of which is associated with a risk area A4, A5, A6, A7, and an outer unique key reader 169 is also provided. The unique key readers are used by the operator in charge of the line reset to perform a reset routine or procedure when a maintenance intervention is performed with entrance of maintenance operators through access door 147 of the second passage 107. The reset routine or procedure may be performed using the unique key readers 161-169 as already described with reference to FIG. 2.

Safety cameras indicated with 171, 173, 175, 177 may be associated with the fence 101, both inside and outside the fence 101.

Also in the case of the fence 101 an alternative method may be provided for more than two operators to access through the first passage 105 in order to perform maintenance operations, after which a reset routine or procedure, as described, is performed. As safety actuators in pairs are associated to the risk areas inside the fence 101 (when necessary, as there are movable members that can be activated for threading) it is possible in this case to allow the entrance of two operators to perform the threading operations. The access of more than two operators causes the disabling of each movement of the mechanical members in the fence 101 and the need for performing the reset routine to restart the line.

The third passage 109 acts as the third passage 29 described with reference to FIG. 2.

In the description above reference has been made to passage 25, 105 that, in order to allow the count of transits, i.e. of the number of people entering and exiting the fence 21 or 101, have two access doors arranged in series, with systems controlling the number of people present in the transit area 35 or 115 and the opening and closing sequence of the access doors. This configuration is particularly advantageous, as it allows an easy passage of the operators in charge of the line management. However, it is also possible to configure the passage 25 or 105 in a different way, maintaining the function of counting the number of people entering and exiting the fence 21 or 101. For instance, a rotating turnstile may be provided. Or a corridor may be provided, equipped with load sensors, or barrier photocells or other detection devices, determining the number of people passing, in combination with a closing system that prevents the access when the machines inside the fence are moving.

The invention claimed is:

1. A web material processing line comprising processing machinery with moving members comprised of at least one unwinder for reels of web material and at least one machine downstream of the at least one unwinder, and a system for controlling safe access to the processing machinery; wherein the system comprises:

at least one fence enclosing an area including one or more of said moving members of the processing machinery, said at least one fence being structured to prevent uncontrolled access to the area enclosed by said at least one fence;

a first passage to access the area enclosed by the at least one fence;

a control arrangement functionally connected to the first passage, the first passage and the control arrangement being configured to count the number of operators entering the area enclosed by the at least one fence and exiting therefrom;

and wherein:

the control arrangement and the first passage are configured to allow the first passage to be opened only when the one or more of said moving members in the area enclosed by the at least one fence is in a safety condition different than a normal operating condition of the processing machinery; and the control arrangement and the first passage are configured to prevent a return to the normal operating condition of the one or more of the moving members, following an access of an operator through the first passage into the area enclosed by said at least one fence, until a same number of operators who entered the area enclosed by the at least one fence through the first passage has exited the area enclosed by the at least one fence through the first passage.

2. The processing line according to claim 1, wherein at least one risk area is provided in the area enclosed by the at least one fence; a number of safety actuators, functionally connected to the control arrangement, are arranged in the at least one risk area enclosed by the at least one fence; and wherein the first passage is controlled so that only a number of operators not greater than the number of safety actuators are allowed to enter the area enclosed by the at least one fence.

3. The processing line according to claim 1, wherein at least one risk area is provided in the area enclosed by the at least one fence; a number of safety actuators are arranged in the at least one risk area enclosed by the at least one fence; and the first passage is controlled by the control arrangement to allow an at least partial activation of at least one function of the processing machinery in the at least one risk area only by simultaneous activation of a number of safety actuators equal to the number of operators who entered the area enclosed by the at least one fence.

4. The processing line according to claim 3, wherein the control arrangement is configured so that, if a number of operators greater than the number of safety actuators enter the at least one risk area enclosed by the at least one fence, the partial activation is prevented at least until the number of operators in the at least one risk area enclosed by the at least one fence decreases so as to be equal to or lower than the number of safety actuators.

5. The processing line according to claim 1, wherein the control arrangement is configured and arranged so that, in case a piece of information about the number of operators passed through the first passage has been lost, the control arrangement prevents return to the normal operating condition of the one or more of the moving members of the processing machinery until a reset routine of the one or more moving members has been performed.

6. The processing line according to claim 1, comprising a second passage to access the area enclosed by the at least one fence; wherein the second passage is controlled to allow the second passage to be opened only when the one or more moving members of the processing machinery is in a safety condition different than the normal operating condition of the one or more moving members.

7. The processing line according to claim 1, wherein the first passage comprises a first access door and a second access door arranged in series and configured to allow only one operator at a time to enter the one or more areas enclosed by the at least one fence and to exit therefrom.

8. The processing line according to claim 7, wherein the first passage comprises:
- a first control member, arranged in an area outside of the at least one fence, to control opening of the first access door;
- a second control member, arranged between the first access door and the second access door, to control opening of the second access door;
- a third control member, arranged in the area enclosed by the at least one fence, to control opening of the second access door;
- a fourth control member, arranged between the first access door and the second access door, to control opening of the first access door.

9. The processing line according to claim 7, wherein the control arrangement is configured to allow the second access door to be opened from the area outside of the at least one fence only when the first access door is closed; and the first access door to be opened from the area enclosed by the at least one fence only when the second access door is closed.

10. The processing line according to claim 8, wherein the control arrangement is configured to allow the second access door to be opened by the second control member only when the first access door is closed; the first access door to be opened by the fourth control member only when the second access door is closed; the second access door to be opened by the third control member only when the first access door is closed; the first access door to be opened by the first control member only when the second access door is closed.

11. The processing line according to claim 7, wherein between the first access door and the second access door an arrangement is provided that prevents the second access door from being opened from the area outside of the at least one fence if more than one operator is present between the first access door and the second access door, and prevents the first access door from being opened from the area enclosed by the at least one fence if more than one operator is present between the first access door and the second access door.

12. The processing line according to claim 1, wherein the first passage comprises a reading member to read a unique identification code of an operator passing through the first passage.

13. The processing line according to claim 1, wherein the area enclosed by the at least one fence is subdivided into a first area and a second area, between which the processing machinery is arranged; the first area is separated from the second area so that there is no passage for an operator from the first area to the second area; the first passage is arranged so as to allow access to the first area; and a third passage is provided to allow access to the second area.

14. The processing line according to claim 13, wherein the third passage is controlled to allow the third passage to be opened only when the one or more moving members of the processing machinery is in a safety condition different than the normal operating condition of the processing machinery.

15. The processing line according to claim 14, wherein the control arrangement is configured and arranged to prevent return to the normal operating condition of the one or more moving members of the processing machinery after an access through the third passage until a reset routine of the one or more moving members has been performed.

16. The processing line according to claim 1, wherein, in the area enclosed by the at least one fence, at least one unique key reader is arranged functionally connected to the control arrangement.

17. The processing line according to claim 16, wherein in the area enclosed by the at least one fence a unique key reader is provided for each risk area within the area enclosed by the at least one fence, the unique key reader for said each risk area being functionally connected to the control arrangement.

18. The processing line according to claim 16, wherein, in the area outside of the at least one fence, an outer unique key reader is arranged, associated with the first passage and functionally connected to the control arrangement.

19. The processing line according to claim 16, wherein the control arrangement is configured to perform a reset routine in case of uncertainty or indeterminacy about presence of operators in the area enclosed by at least one fence, and to prevent operation of the one or more moving members of the processing machinery in case said reset routine has not been performed.

20. The processing line according to claim 19, wherein the reset routine comprises steps as follows:
- a step, wherein a qualified operator who is in the area enclosed by the at least one fence, inserts a unique key in each of the at least one unique key reader arranged in the area inside enclosed by the at least one fence when the first passage and the second passage, if any, are closed; a step, wherein the at least one unique key reader in the area enclosed by the at least one fence reads the unique key;
- a step, wherein the qualified operator exits the area enclosed by the at least one fence through the first passage.

21. The processing line according to claim 18, wherein the reset routine comprises steps as follows:
- a step, wherein a qualified operator who is in the area enclosed by the at least one fence, inserts a unique key in each of the at least one unique key reader arranged in the area enclosed by the at least one fence when the first passage and the second passage, if any, are closed; a step, wherein the at least one unique key reader in the area enclosed by the at least one fence reads the unique key;
- a step, wherein the qualified operator exits the area enclosed by the at least one fence through the first passage;
- and wherein the reset routine further comprises a step wherein the qualified operator inserts the unique key into the outer unique key reader and the outer unique key reader reads the unique key after the qualified operator has exited the at least one fence.

22. The processing line according to claim 1, wherein the safety condition is a condition of stoppage of the one or more moving members of the processing machinery.

23. The processing line according to claim 1, wherein downstream of the at least one unwinder machines as follows are arranged: at least one rewinding machine, which produces rolls by winding web material delivered by a first unwinder, and at least one machine for sealing a tail end of rolls produced by the at least one rewinding machine.

24. The processing line according to claim 1, wherein between two consecutive machines of the processing line a web material feeding and threading path is arranged.

25. The processing line according to claim 24, wherein at least one risk area is provided in the area enclosed by the at least one fence, said at least one risk being present between the two consecutive machines of the processing line, with web threading members being arranged in the at least one risk area.

26. The processing line according to claim 1, wherein said at least one unwinder comprises a first unwinder and a second unwinder, and further comprising an embosser; wherein paths for web material are provided along the processing line from the first unwinder and the second unwinder to the embosser and from the embosser to a rewinding machine; and wherein web-threading members are provided for threading the web material in the respective paths.

27. The processing line according to claim 26, wherein the first unwinder and the second unwinder are arranged in the area enclosed by the at least one fence, and wherein said at least one fence comprises a first fence and a second fence, inside which at least the embosser and the rewinding machine are arranged.

28. The processing line according to claim 27, wherein at least one risk area is provided in the area enclosed by the at least one fence, arranged in one or more positions as follows: upstream of the first unwinder, between the first unwinder and the second unwinder, between the second unwinder and the embosser, between the embosser and the rewinding machine, and between the rewinding machine and the machine for closing a tail end of rolls produced.

29. The processing line according to claim 1, wherein the safety condition is a condition wherein threading of the web material can be performed.

30. The processing line according to claim 29, wherein the control arrangement is configured such that a jog operating condition, to perform threading, can be initiated only when a number of safety actuators are equal to a number of operators who have accessed the area enclosed by the at least one fence, is operated, the safety actuators being arranged at such a distance that a single operator cannot activate simultaneously more than one safety actuator.

* * * * *